United States Patent
Acharya et al.

(10) Patent No.: US 6,813,384 B1
(45) Date of Patent: Nov. 2, 2004

(54) INDEXING WAVELET COMPRESSED VIDEO FOR EFFICIENT DATA HANDLING

(75) Inventors: Tinku Acharya, Tempe, AZ (US);
Yap-Peng Tan, Vancouver, WA (US);
Ping-Sing Tsai, Gilbert, AZ (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/438,091

(22) Filed: Nov. 10, 1999

(51) Int. Cl.[7] ................................................. G06K 9/36
(52) U.S. Cl. ..................... 382/232; 382/240; 382/305; 707/101
(58) Field of Search .............................. 707/101, 104.1, 707/100; 382/305, 306, 240, 232; 358/403; 348/231.99, 231.2, 231.3, 398.1, 437.1, 438.1; 375/240.11, 240.19

(56) References Cited

U.S. PATENT DOCUMENTS

| | | | | |
|---|---|---|---|---|
| 4,751,583 A | * | 6/1988 | Levine | 358/403 |
| 5,321,776 A | * | 6/1994 | Shapiro | 382/240 |
| 5,915,038 A | * | 6/1999 | Abdel-Mottaleb et al. | 382/209 |

* cited by examiner

*Primary Examiner*—Yon J. Couso
(74) *Attorney, Agent, or Firm*—Trop, Pruner & Hu, P.C.

(57) ABSTRACT

A system of indexing discrete wavelet transform data, after entropy encoding, allows access to particular frames and sub-bands without decomposing all of the data to find the information of interest. In one embodiment a header may include the frame size in bytes followed by the sizes of each of the sub-bands in a predetermined order.

32 Claims, 5 Drawing Sheets

INDEXING WAVELET COMPRESSED VIDEO FOR EFFICIENT DATA HANDLING

BACKGROUND

This invention relates generally to image processing and computer graphics. More specifically, the invention relates to compression of video using wavelet transforms.

In general, video compression techniques reduce the bit rate used for storing or transmitting video while hopefully maintaining acceptable video quality. Compression of video normally involves transforming the video data to reduce correlation between adjacent pixels. The transformed data may then be quantized to reduce the amount of data. The quantized data is then encoded for transmission or storage.

In a discrete cosine transform (DCT) a plurality of small blocks are each subjected to a transformation. In discrete wavelet transformation (DWT) the full and entire frame may be transformed. DCT differs from DWT in that only in DWT can one develop the image from the transformed data.

DWT is a multi-level, multi-resolution decomposition technique. Each row of a video image frame is subjected to low pass filtering followed by the elimination of alternating coefficients. Each row is then subjected to high pass filtering followed by the elimination of alternating coefficients. Each row of the image frame then has a set of low pass filter coefficients followed by a set of high pass filter coefficients. The low pass and high pass filtering are then repeated in the vertical dimension with alternating coefficients eliminated as described above.

A result of the low pass filtering with down-sampling in the horizontal dimension is a horizontally narrowed image having the same height as the original image. A result of low pass filtering with down-sampling in the vertical dimension of the horizontal low pass filtered image, a scaled image may be created which is reduced in both height and width. However, the image may otherwise be a reasonably accurate scale depiction of the original image. High pass filtering creates edge detail.

Thus DWT may produce four sub-bands including the LL sub-band which is the scaled version of the original image and results from one dimensional low pass filtering in both the horizontal and vertical dimensions. The LH sub-band, containing vertical edge information, is the result of low pass filtering in the horizontal dimension and high pass filtering in the vertical dimension. The HL sub-band, containing horizontal edge information, is the result of high pass filtering in the horizontal direction and low pass filtering in the vertical direction. The HH sub-band is mostly high frequency noise.

DWT may be repeatedly applied to each newly created LL sub-band, as one example. Thus a level one DWT decomposition may include the four sub-bands LL, HL, LH and HH. A level two decomposition may include seven sub-bands and a level three decomposition may include ten sub-bands and so on.

After transformation, the video data may be subjected to quantization and entropy or "variable length" encoding. In variable length encoding, shorter code lengths are allocated to the most frequently utilized symbols. Longer code lengths are allocated to less frequently used symbols. Thus, as a result, the encoded signal portions have lengths which may be variable throughout the data stream depending on the frequency with which particular symbols happen to be utilized.

In a number of cases using DWT, it is desirable to access a particular sub-band. However because of variable length encoding, each compressed frame and each compressed video sequence, can only be sequentially processed. That is, each compressed frame is not accessible before all of its previous frames have been decompressed.

This makes video processing more difficult. For example, non-sequential frame decompression, fast forward and reverse, low resolution preview, display frame buffer control, frame dropping or skipping, non-linear video processing, editing and retrieving are more difficult and time-consuming because it is necessary to decompress all the previous frames before any information can be reviewed. This limits the efficiency of the compressed video handling.

Particularly in connection with DWT, it is often desirable to access the LL-band since the LL-band provides a scaled version of the original image. However again, because of variable length encoding, after the compression is done, the only way to access any particular piece of information within the sequence is to decompress the entire sequence.

Thus there is a continuing need to enable the location information in discrete wavelet transformation compressed data without necessitating the decompression of each sequential frame.

SUMMARY

In accordance with one aspect, a method includes computing size information for a discrete wavelet transform base compressed data frame. The compressed data frame is indexed with the size information.

Other aspects are set forth in the accompanying detailed description and claims.

DETAILED DESCRIPTION

Figure 1:
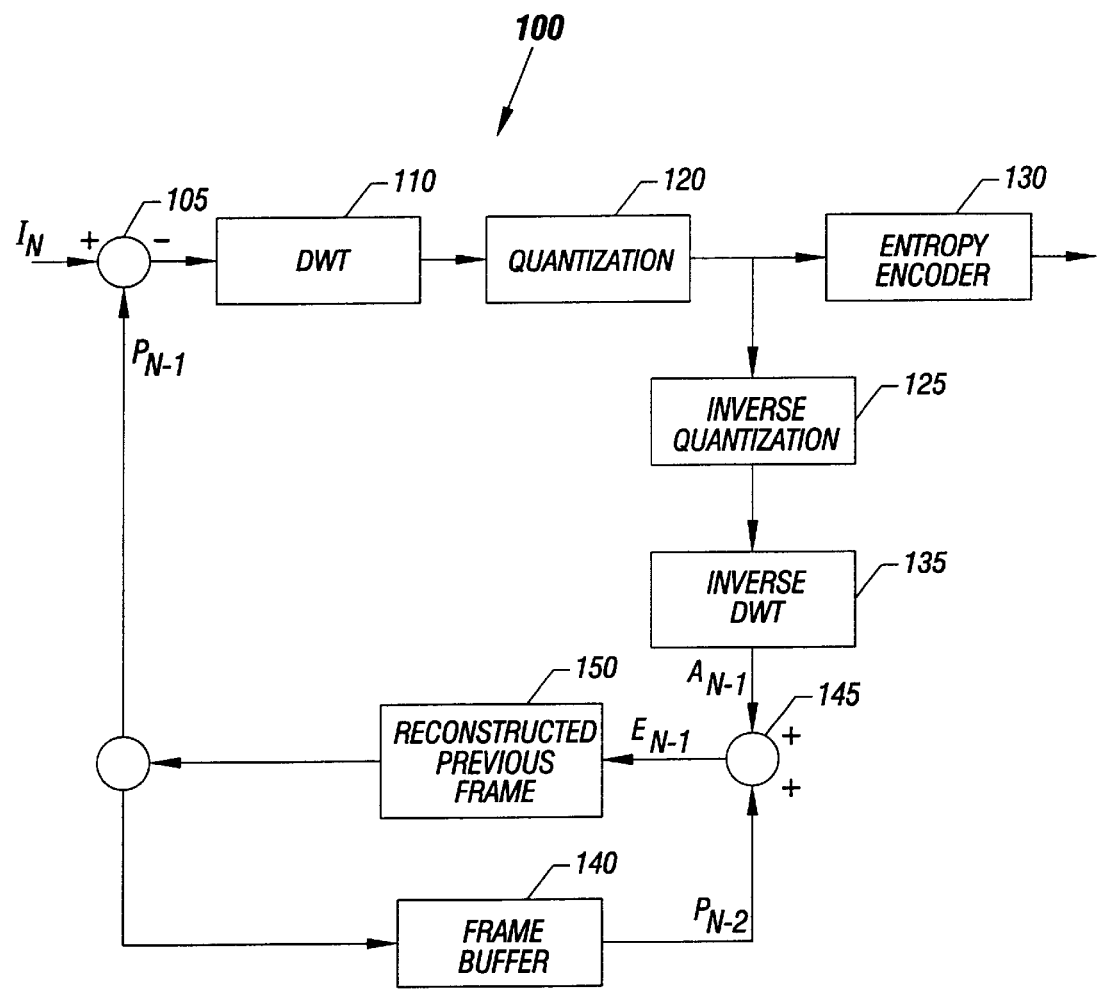
FIG. 1 illustrates a video encoder in accordance with one embodiment of the present invention.

Referring to FIG. 1, a digital image processing system 100 in accordance with one embodiment of invention, receives raw captured digital data $I_N$, for example from a digital camera, and outputs from an entropy encoder 130 a stream of compressed data to a processor-based system (not shown), for storage or transmission, as examples. A plurality of difference frames may be generated. Difference frames may be compressed and then the compressed difference frame may be transmitted by the entropy encoder 130.

Each difference frame indicates a difference in pixel intensities (on a pixel-by-pixel basis) between two successive images represented by the data $I_N$ that is captured by an imaging device, such as a camera. Because typically little motion occurs between two successive captured pixel images, the resulting in difference frame may include a substantial amount of nonessential and redundant information that may be removed by compression. Thus, in general, a compressed difference frame is much smaller than any other captured frames.

For purposes of reducing the potential amplification of artifacts by compression/decompression, the system may decompress a copy of each compressed frame in an attempt to reconstruct the frame as originally captured. However, instead of being an exact duplicate of the corresponding captured frame, the reconstructed frame indicates errors that are introduced by the compression/decompression process. The system may use the reconstructed frame in a feedback loop 150 to minimize artifacts introduced by the compression/decompression process.

A processor-based system coupled to the system 100 reconstructs the captured frames from the difference frames for purposes of displaying images on a monitor as an example. In this manner, to reconstruct the next frame, the processor-based system decompresses a newly received difference frame and adds this difference frame to a previously reconstructed frame (a frame that indicates the image currently being displayed). Without error compensation, however, errors may be amplified by the compression/decompression process. These amplified errors would appear in the resulting displayed image.

Thus, a processor-based system may reconstruct frames called reconstructed frames from compressed difference frames. The reconstructed frames may be used in a feedback loop to minimize the amplification of errors in a compression/decompression process. The feedback loop is also used to form the difference frames.

A frame adder circuit 105 forms a current difference frame by subtracting intensity values indicated by a prior reconstructed frame, indicated as $P_{N-1}$, from the corresponding intensity values indicated by the currently captured frame indicated as $I_N$.

A decompression circuit, including an inverse quantization stage 125 and inverse discrete wavelet transform stage 135, processes copies of the compressed difference frames which are generated by a discrete wavelet transform stage 110 and a quantization stage 120. The discrete wavelet transform stage 110 receives a difference frame from the adder circuit 105. The inverse quantization stage 125 and inverse DWT stage 135 decompress the copies of the compressed difference frames to generate decompressed difference frames.

A frame adder circuit 145 receives decompressed difference frames and generates the reconstructed frames $E_{N-1}$. To accomplish this, the frame adder circuit 145 generates each new reconstructed frame by combining the most recently decompressed difference frame $A_{N-1}$ with the prior reconstructed frame $P_{N-2}$. Thus, for example, the frame buffer 140 generates a prior reconstructed frame PN-2 used to generate the difference frame by combining the reconstructed frame with the prior difference frame.

Figure 2:
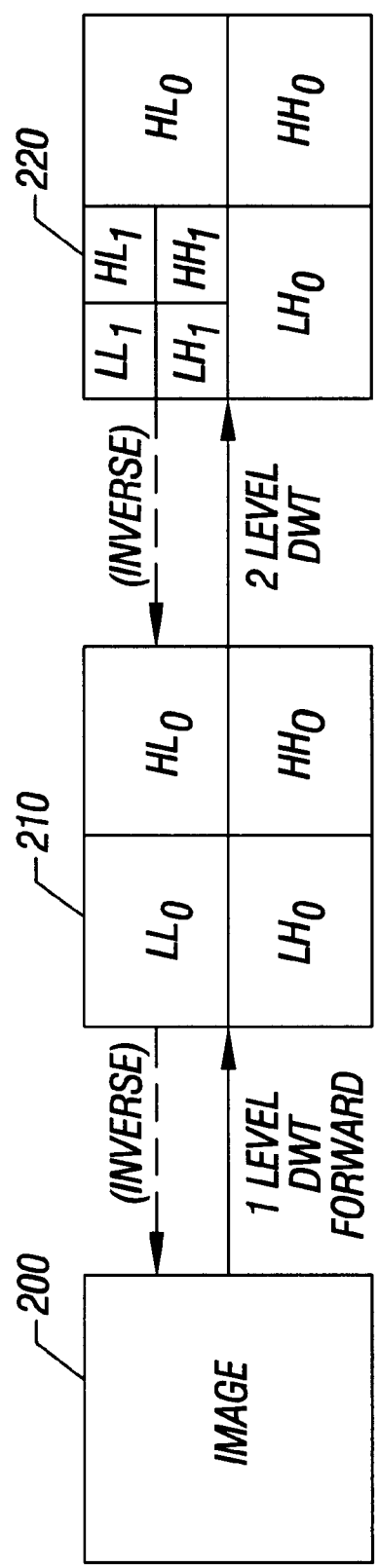
FIG. 2 illustrates the sub-bands resulting from forward DWT operation upon an image.

Referring to FIG. 2, an original image 200 may be transformed by the DWT transform 210 to an image frame 210 including the bands $LL_0$ $LH_0$ $HL_0$ $HH_0$, the subscripts indicating a level one DWT forward transformation. Similarly, the $LL_0$ sub-band may then be transformed as indicated at 220 in FIG. 2, to form the $LL_1$, $LH_1$, $HL_1$ and $HH_1$ sub-bands, the subscript 1 indicating the second level of DWT forward transformation. The inverse transformation implemented by the inverse DWT 135 (FIG. 1) is indicated in dashed lines between the level 220 and the level 210 and between the level 210 and the image 200.

In wavelet based video compression, each video frame or residual frame is compressed using wavelet transform based compression algorithms normally used in still image compression. When encoding a video frame, several levels of wavelet decomposition are usually performed on the frame. Each level of decomposition generates four sub-bands LL, LH, HL and HH where L and H denote low frequency and high frequency bands respectfully. Often the following level of decomposition is applied only to the LL sub-band created in the previous level. As a result, there are 3N+1 sub-bands in total after N levels of wavelet decomposition. If $XY_k$ is the XY sub-band of the $k^{th}$ level decomposition, where x and y equal L or H, then k equals 0, 1, . . ., N−1, for N levels of wavelet decomposition. The $LL_k$ sub-band is composed of sub-bands $LL_{k+1}$, $LH_{k+1}$, $HL_{k+1}$ and $HH_{k+1}$, where k equals 0, 1, . . ., N−2.

After wavelet transformation, the decomposed sub-bands are then quantized and entropy encoded. Entropy encoding may including run length or Huffman encoding as examples. To achieve a good compression ratio, due to the differences in perceptual importance and transformed data statistics in different sub-bands, different quantization steps and entropy encoding tables may be used in different wavelet sub-bands. After entropy encoding, the compressed data sizes of different sub-bands are usually different. When using coded data that are stored sequentially in memory, each sub-band is not accessible before all its preceding sub-bands have been processed.

For example, hypothetical encoded sub-bands may be stored in memory as follows:

$$C_{LL_2}, C_{LH_2}, C_{HL_2}, C_{HH_2}, C_{LH_1,} {}_{cHL_1}, C_{HH_1}, C_{LH_0}, C_{HL_0}, C_{HH_0}.$$

In this case "C" indicates that the data is compressed and the subscript, such as LL, indicates the sub-band that is involved and the sub-subscript such as the numbers 0, 1, or 2 indicate the decomposition level. As a result, the sequence of wavelet compressed video frames are concatenated together sequentially, and each frame is not accessible before all the previous frames have been decompressed.

However, if the location of each video frame is indexed, together with its sub-bands, within a wavelet compressed video sequence, the information may be readily obtained to enable any sub-band to be located and decompressed out of sequence. During the compression phase, the number of bytes in each sub-band is recorded in the beginning of the data, for example as part of the header of each compressed video frame.

If $B_{XY_k}$ is the data size of the $XY_k$ sub-band, the data sizes of each frame and its sub-bands can be indexed as follows:

$$B_F, B_{LL_{N-1}}, B_{LH_{N-1}}, B_{HL_{N-1}}, B_{HH_{N-1}}, B_{LH_{N-2}}, B_{HL_{N-2}}, BH_{HH_{N-2}},$$
$$B_{HH_1}, B_{LH_0}, B_{HL_0}(B_{HH_0})$$

where $B_F = B_{LL_0} + B_{LH_0} + B_{HL_0} + B_{HH_0}$ is the total data size of the frame in bytes. ($B_{HH_0}$ is shown in parentheses because its inclusion is optional as its value can be calculated by subtracting all the other values from BF, as shown below if the number of decompositions is predefined.) The data size of the LL sub-band in each level of decomposition can be computed as follows:

$$B_{LL_{c-1}} = B_{LL_n} + B_{LH_s} + B_{HL+_c} + B_{HH_c}$$

The data size of the sub-band $HH_0$ can be computed as follows:

$$B_{HH_0} = B_F - (B_{LL_0} + B_{LH_0} + B_{HL_0})$$

In this way, indexing information may be embedded in the compressed video frame header.

As a simple example for the two level DWT transform indicated at 110 in FIG. 2, $B_{LL_1}$ may be 15 bytes, $B_{LH_1}$ 10 bytes, $B_{HL_1}$ 9 bytes, $B_{HH_1}$ 8 bytes, $B_{LH_0}$ 5 bytes, $B_{HL_0}$ 4 bytes and $B_{HH_0}$ 1 byte, as a hypothetical example. In this case $B_F$ is equal to 52 bytes. Thus the header would appear as follows: 52|15|10|9|8|5|4|1.

Once one knows that the first number is BF which is indicative of the total number of bytes, one can determine the number of levels. One can also locate any particular level in the header data which follows behind the total number of bytes if the sub-bands are always ordered one after another in a predetermined sequence. For example if it is known that each header location is 1 byte in length, and it is known that the total size is 52 bytes, then $B_{LL_1}$ must be the next number, 15 bytes, in the sequence above. One can then index through the data to find any desired level. Moreover one can determine the number of levels of decomposition by adding the number of entries of the header and using the formula $$N = \frac{H-2}{3}$$

where H is the number of header entries. The number of entries may be found by determining how many entries, when summed together, equal BF. For example for the simple numerical example 52|15|10|9|8|5|4|1, H is 8 and so the number of levels of decomposition is 2 (8⅔).

Figure 3:
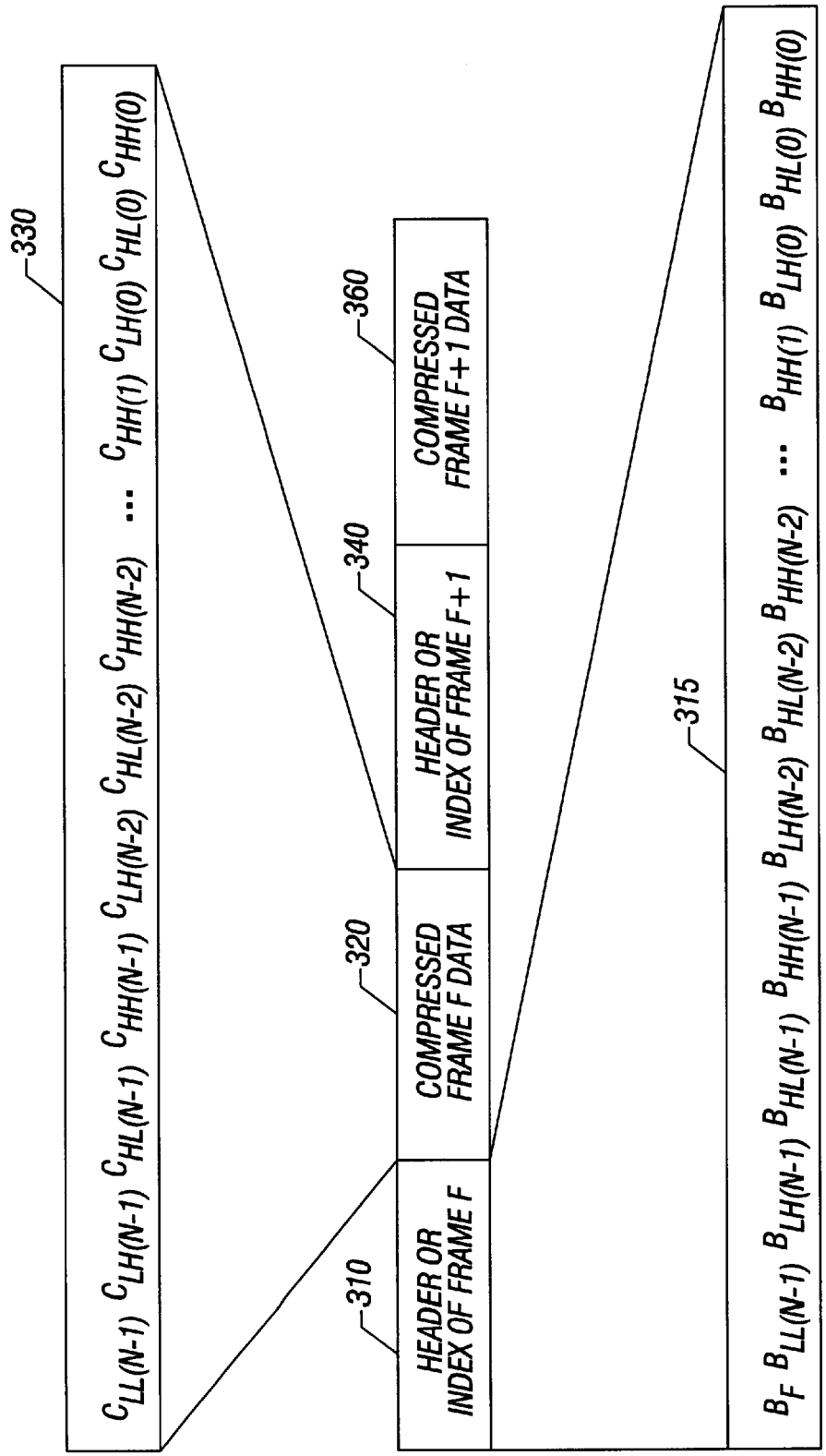
FIG. 3 is a diagram of indexing according to one embodiment of the invention.

Thus referring to FIG. 3, the compressed data at 330 may be contained in an area 320 of compressed frame data. The header 310 may precede each set frame data. For example, as indicated at 315, the header information may follow the equations set forth therein. Sequences of frame data 320 and 360 are preceded in each case by a header as indicated at 310 and 340.

It is also possible that the number of levels may be adaptive. That is, for a given set of data the number of levels may change in the course of the data stream. For example the number of levels may change from frame to frame. With the indexing information, it is possible to still find any given sub-band even if the number of levels may change since it is known where each sub-band starts in the following data, and so the number of levels can be derived.

Figure 4:
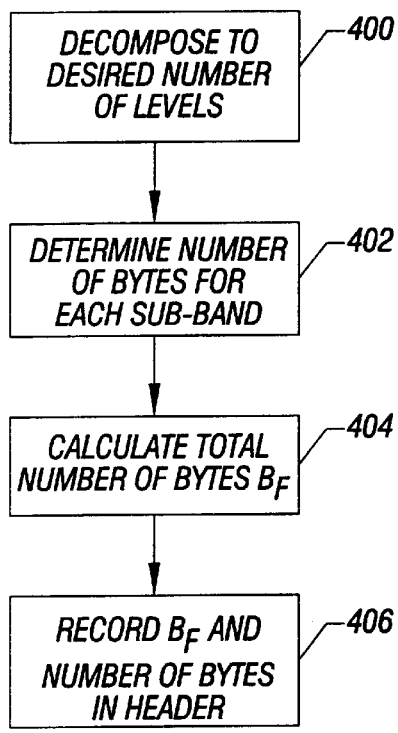
FIG. 4 is flow diagram for software for creating the indexed DWT decomposition in accordance with one embodiment of the invention.

Referring to FIG. 4, software for implementing one embodiment of the present invention may begin by decomposing to the desired number of levels as indicated at block 400. Initially, the transformation may implemented to develop the desired number of sub-bands at the desired number of levels. The number of bytes for each sub-band may be calculated as determined in block 402. Next, the total number of bytes for all the sub-bands is added up to determine $B_F$ as indicated at 404. Then, $B_F$ and the number of bytes for each sub-band may be recorded to form a header as indicated at block 406.

In many cases, each frame may contain several color planes such as the RGB or YUV color planes. The compressed color planes may be stored one after another or in an interleaved fashion. In the first case, each color plane may be treated as a single frame and the above indexing method may be utilized. If the sub-bands of different color planes of each video frame are stored in an interleaved fashion, for example for color planes in a YUV system, the sequence may be as follows:

$[Y_{LL_{N-1}}U_{LL_{N-1}}V_{LL_{N-1}}][Y_{LH_{N-1}}U_{LH_{N-1}}V_{LH_{N-1}}][Y_{HL_{N-1}}\ldots[Y_{HH_{N-1}}U_{HH_{N-1}}V_{HH_{N-1}}][Y_{LH_{N-2}}U_{LH_{N-2}}V_{LH_{N-2}}]\ldots[Y_{HH_0}U_{HH_0}V_{HH_0}]$ The indexing information of each compressed video frame may then be modified as follows:

$B_{YF}B_{UF}B_{VF}B_{YLL_{N-1}}B_{ULL_{N-1}}B_{VLL_{N-1}}B_{YLH_{N-1}}B_{ULH_{N-1}}B_{VLH_{N-1}}B_{YLH_{N-1}}B_{UHL_{N-1}}B_{VHL_{N-1}}B_{YHH_{N-1}}$ $B_{UHH_{N-1}}B_{VHH_{N-1}}B_{YLH_{N-2}}B_{ULH_{N-2}}B_{VLH_{N-2}}\ldots B_{VLH_0}B_{YHL_0}B_{UHL_0}B_{VHL_0}(B_{YHH_0}B_{UHH_0}B_{VHH_0})$ where $B_{CF}$ $B_{CLL_0}+B_{CLH_0}+B_{CHL_0}+B_{CHH_0}$ for C=Y, U, V. The sizes of the $LL_k$ and $HH_0$ sub-bands in each color plane can be computed similarly as described above. (If the number of transformations is pre-defined the $B_{HH_0}$ terms may be omitted.)

By embedding the indexing information, a compressed video sequence may be processed more efficiently. For instance, before the decompression of the compressed video, the embedded indexing information can be quickly parsed to form a map of the locations of each frame and even sub-bands within the compressed data. This map can then be used to fast-forward/fast-reverse the video. Only a downsampled number of frames or key frames may be decompressed and displayed. In addition a low resolution preview may be formed which is spatially and temporally of lower resolution. Similarly, scene control information may be extracted, such as edge information from high frequency sub-bands. Also intelligent framed buffer control may be performed by dropping or skipping less significant frames or sub-bands, by cutting and pasting the compressed video sequences in a non-linear fashion and by extracting the relevant portion from the compressed video for rapid video content analysis.

Figure 5:
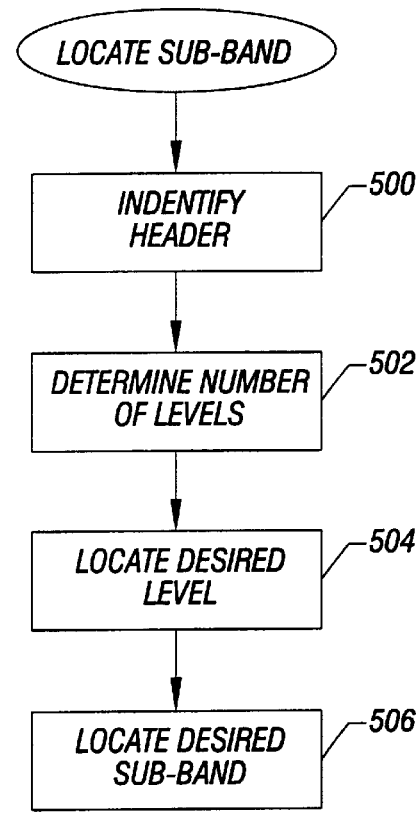
FIG. 5 is a flow diagram for software for using indexed DWT decomposition.

Referring to FIG. 5, to locate a particular sub-band within the compressed data, initially one locates the header as indicated in block 500. The header may be appropriately marked to assist in its ready identification. The number of levels is then determined as described above and as indicated in block 502. The desired level may then be located within the data using the data size, the number of levels and the data size of each level as indicated in block 504. Thereafter, the desired sub-band within the level may be located as indicated in block 506. In this way, any desired sub-band may be located without decompressing the entire stream of data.

Figure 6:
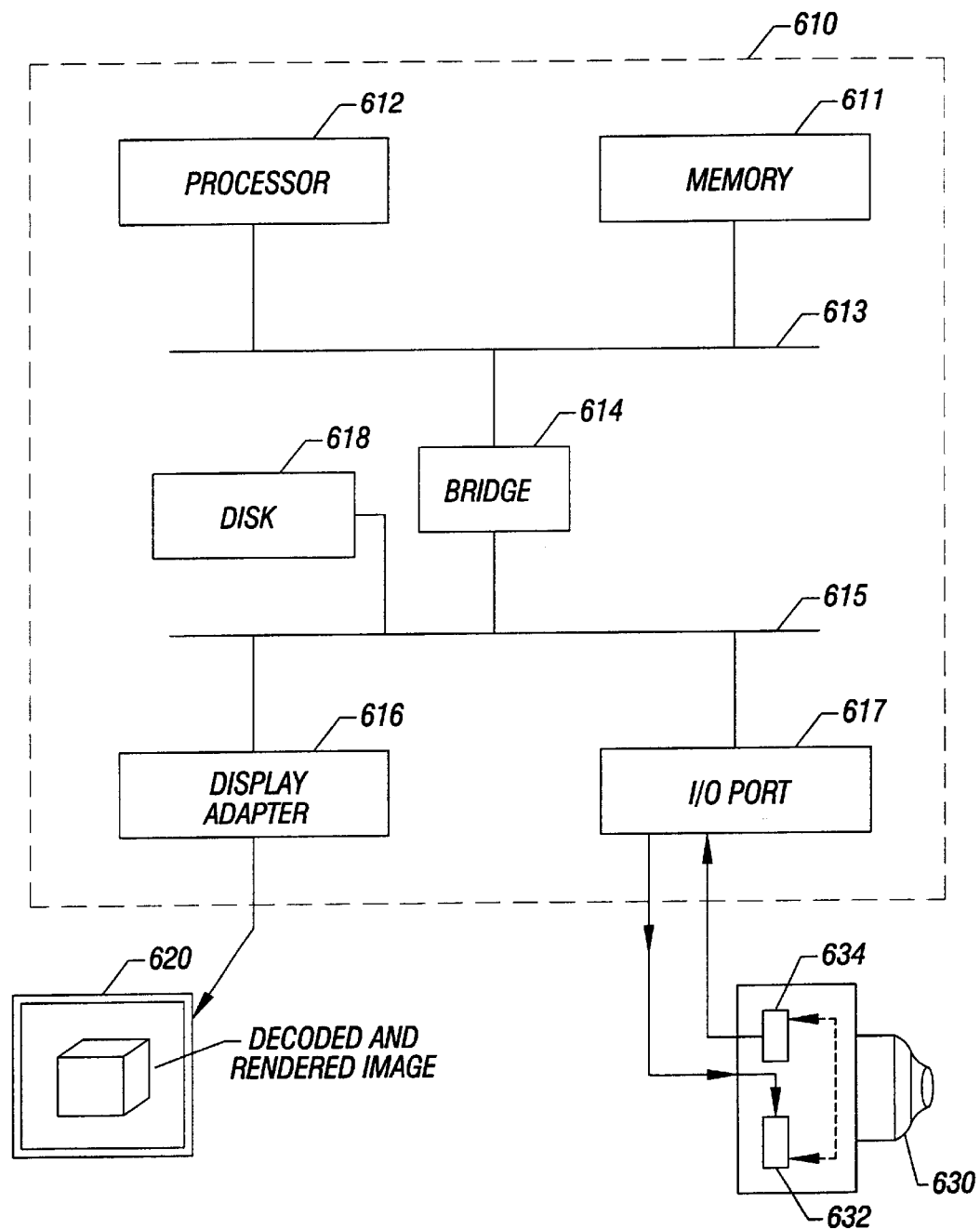
FIG. 6 is a system diagram of one embodiment of the invention.

A computer system 610, shown in FIG. 6, may be any general or special purpose computing or data processing machine such as a personal computer, coupled to a camera 630. The camera 630 may be a digital camera, digital video camera, or any image capture device or imaging system, or combination thereof and is utilized to capture a sequence of images of a scene 640. Captured images are processed by an image processing circuit 632 so that they can be efficiently stored in an image memory unit 634, which may be a storage device such as a fixed disk. In some digital video cameras a sequence of images are stored first and downloaded later. This allows the camera 630 to capture the next object/scene quickly without additional delay. However, in the case of digital video camera, especially one used for live videoconferencing, it is important that images not only be quickly captured, but quickly processed and transmitted out of camera 630. Embodiments of the present invention provide scaled image previews, and fast throughput to other parts of the image processing circuit 632 so that the overall speed of transmitting image frames may be increased.

Video frame compression and indexing may be carried out within the image processing circuit 632 in one embodiment of the invention. The process of DWT based video encoding and indexing may be applied to any image sequence whether captured by camera 630 or obtained elsewhere. Since the inverse and forward DWT are essentially filtering operations, one of ordinary skill in the art may program computer system 610 to perform DWT based filtering. This may be done using a processor 612 and a memory 611, which is used to store/load instructions, addresses and result data as needed.

Thus, in an alternative embodiment, video encoding and indexing may be achieved in a software application running on computer system 610 rather than directly in hardware. An application used to generate encoded video data after download from camera 630 may be from an executable compiled from source code written in a language such as C++ as one example. The instructions of that executable file, which correspond with instructions to scale the image, may be stored to a disk 618, such as a floppy disk, hard disk, compact disk or other memory 611. Further, embodiments of the invention may be implemented onto a video display adapter or graphics processing unit that provides video frame indexing.

The computer system 610 may have a system bus 613 which facilitates information transfer to and from the processor 612, memory 611 and a bridge 614. The bridge 614 couples to an I/O bus 615. The I/O bus 615 couples various I/O devices such as a display adapter 616, disk 618 and an I/O port 617, such as a serial port.

When video, such as video of a scene 640, is captured by camera 630, it is sent to the image processing circuit 632. The image processing circuit 632 includes components which can execute, among other functions, the encoding of the captured video using DWT. The video encoding procedure, as described earlier, may utilize an image memory unit to store one frame of the scene 640 captured by the camera 630. Further, this same memory unit can be used to store the intermediate data results from the forward DWT or the inverses of these operations. When the user or application desires a download of video, the encoded and compressed frame data stored in the image memory unit is transferred from image memory unit 634 to the I/O port 617. I/O port 617 uses the bus-bridge hierarchy shown (I/O bus 615 to bridge 614 to system bus 613) to temporarily store the compressed/encoded frame data into memory 611 or, optionally, disk 618.

The compressed and indexed video may be decoded on computer system 612 by suitable application software (or hardware), which may utilize the processor 612. The video sequence may then be reconstructed and rendered visually using a display adapter 616 into a rendered video. The decoded video will be substantially of the same quality as the original pre-encoded sequence even if represented in scaled format. In a videoconferencing application, the video data in its compressed and indexed form may be communicated over a network or communication system to another node or computer system in addition to or exclusive of computer system 610 so that a videoconferencing session may take place. Since compressing and indexing are already achieved on-camera in one embodiment of the invention, it may be possible to implement a communication port in camera 630 that allows the image data to be transported directly to the other node(s) in a videoconferencing session. Wherever a user of computer system 610 also desires to see his or her own scene on the monitor 620, video that is encoded may be sent both to computer system 610 and transported over a network to other nodes. As discussed earlier, the decoded video may be amenable to rapid downscaling and have efficient frame skipping or fast forwarding due to the indexing of the DWT sub-bands. The end result may be a quickly decodable and efficiently rendered video 650 that may be displayed on a monitor 620 or other nodes in a videoconferencing session as compared with conventional systems.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   computing size information for a discrete wavelet transform based compressed data frame, wherein said compressed data frame is capable of being accessed before previous frames have been decompressed; and
   indexing said compressed data frame with said size information to enable access to said compressed data frame without decompressing another sequentially compressed data frame.

2. The method of claim 1 wherein computing is achieved during discrete wavelet transform based image sequence compression.

3. The method of claim 2 wherein computing includes:
   tracking individually the sizes of the compressed LH, HL and HH sub-bands of a level of discrete wavelet transform decomposition; and
   tracking the size of the compressed LL sub-band of the highest level of discrete wavelet transform decomposition.

4. The method of claim 3 wherein computing includes tracking the total size of the compressed discrete wavelet transform frame.

5. The method of claim 4 wherein indexing includes prefixing each of said discrete wavelet transform based compressed data frames with said size information.

6. The method of claim 5 including skipping shipping indexed data frames during decompression by reading the total compressed frame size at a current location, adding said read frame size to the current location, and repeatedly reading and adding until no more frames are to be skipped.

7. The method of claim 5 wherein a scaled preview of said discrete wavelet transform compressed data frames is performed by:
   if the scaling down factor is four raised to the power of the number of levels of discrete wavelet transform decomposition, outputting the decoded highest level LL sub-band data as the scaled preview; and
   if the scaling down factor is four raised to the power of a given level of discrete wavelet transform decomposition, outputting the decoded and reconstructed LL sub-band of a level as the scaled preview.

8. The method of claim 7 further comprising reconstructing said LL sub-band of said a level by performing an inverse discrete wavelet transform upon the decoded HL, LH and HH sub-bands of the previous level and the decoded LL sub-band of the level previous to a level and the reconstructed LL sub-band of the level previous to said level.

9. The method of claim 7 where said output data frames represent images.

10. The method of claim 1 including embedding information about the number of levels with said indexed compressed data frame.

11. An article comprising a medium storing instructions that, if executed, enable a processor-based system to:
   compute size information for a discrete wavelet transform based compressed data frame, wherein said compressed data frame is capable of being accessed before previous frames have been decompressed; and index said data compressed frame with said size information to enable access to said compressed data frame without decompressing another sequentially compressed data frame.

12. The article of claim 11 further storing instructions that cause a processor-based system to prefix each of said discrete wavelet transform based compressed data frames with said size information.

13. The article of claim 11 further storing instructions that cause a processor-based system to embed information about the number of levels with said indexed compressed data frame.

14. A system comprising:
an image processing circuit to index each one of a set of compressed data frames, wherein said each one of said set of compressed data frames is capable of being accessed before previous frames have been decompressed; and
an image memory unit to store said index as a prefix to said compressed data frames, said unit coupled to said image processing circuit, said compressed data frames to enable access to at least one of said set of compressed data frames without decompressing sequentially said set of compressed data frames.

15. The system of claim 14 wherein said image processing circuit is included in a digital camera.

16. The system of claim 15 wherein said set of compressed data frames may be skipped during output by referring to said index.

17. The system of claim 15 wherein said set of compressed data frames may be previewed.

18. A method comprising:
computing size information for a discrete wavelet transform based compressed data frame, wherein computing is achieved during discrete wavelet transform based image sequence compression, and computing includes:
tracking individually the sizes of the compressed LH, HL and HH sub-bands of a level of discrete wavelet transform decomposition and
tracking the size of the compressed LL sub-band of the highest level of discrete wavelet transform decomposition; and
indexing said compressed data frame with said size information.

19. The method of claim 18 wherein computing includes tracking the total size of the compressed discrete wavelet transform frame.

20. The method of claim 19 wherein indexing includes prefixing each of said discrete wavelet transform based compressed data frames with said size information.

21. The method of claim 20 including skipping indexed data frames during decompression by reading the total compressed frame size at a current location, adding said read frame size to the current location, and repeatedly reading and adding until no more frames are to be skipped.

22. The method of claim 20 wherein a scaled preview of said discrete wavelet transform compressed data frames is performed by:
if the scaling down factor is four raised to the power of the number of levels of discrete wavelet transform decomposition, outputting the decoded highest level LL sub-band data as the scaled preview; and
if the scaling down factor is four raised to the power of a given level of discrete wavelet transform decomposition, outputting the decoded and reconstructed LL sub-band of a level as the scaled preview.

23. The method of claim 22 further comprising reconstructing said LL sub-band of said a level by performing an inverse discrete wavelet transform upon the decoded HL, LH and HH sub-bands of the previous level and the decoded LL sub-band of the level previous to a level and the reconstructed LL sub-band of the level previous to said level.

24. The method of claim 22 where said output data frames represent images.

25. The method of claim 18 including embedding information about the number of levels with said indexed compressed data frame.

26. An article comprising a medium storing instructions that, if executed, enable a processor-based system to:
compute size information for a discrete wavelet transform based compressed data frame, wherein computing the size information includes:
tracking individually the sizes of the compressed LH, HL and HH sub-bands of a level of discrete wavelet transform decomposition;
tracking the size of the compressed LL sub-band of the highest level of discrete wavelet transform decomposition; and
index said data compressed frame with said size information.

27. The article of claim 26 further storing instructions that, if executed, enable a processor-based system to prefix each of said discrete wavelet transform based compressed data frames with said size information.

28. The article of claim 26 further storing instructions that, if executed, enable a processor-based system to embed information about the number of levels with said indexed compressed data frame.

29. A system comprising:
an image processing circuit to index each one of a set of compressed data frames and to track individually the sizes of the compressed LH, HL and HH sub-bands of a level of discrete wavelet transform decomposition and to track the size of the compressed LL sub-band of the highest level of discrete wavelet transform decomposition; and
an image memory unit to store said index as a prefix to said compressed data frames, said unit coupled to said image processing circuit.

30. The system of claim 29 wherein said image processing circuit is included in a digital camera.

31. The system of claim 30 wherein said set of compressed data frames may be skipped during output by referring to said index.

32. The system of claim 30 wherein said set of compressed data frames may be previewed.

* * * * *

UNITED STATES PATENT AND TRADEMARK OFFICE
CERTIFICATE OF CORRECTION

PATENT NO. : 6,813,384 B1 Page 1 of 1
DATED : November 2, 2004
INVENTOR(S) : Tinku Acharya, Yap-Peng Tan and Ping-Sing Tsai It is certified that error appears in the above-identified patent and that said Letters Patent is hereby corrected as shown below:

Column 8,
Line 34, delete "shipping".

Signed and Sealed this

Fifteenth Day of March, 2005

JON W. DUDAS
*Director of the United States Patent and Trademark Office*